(12) United States Patent
Vendely et al.

(10) Patent No.: US 6,648,371 B2
(45) Date of Patent: Nov. 18, 2003

(54) VARIABLE VENTING AIR BAG ASSEMBLY

(75) Inventors: Michael Joseph Vendely, Kettering, OH (US); Michael Allen Schenck, Miamisburg, OH (US); Shawn Gregory Ryan, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/189,990

(22) Filed: Jul. 5, 2002

(65) Prior Publication Data

US 2003/0020266 A1 Jan. 30, 2003

Related U.S. Application Data

(60) Provisional application No. 60/305,004, filed on Jul. 12, 2001.

(51) Int. Cl.$^7$ ................................................. B60R 21/28
(52) U.S. Cl. ..................................... 280/739; 280/743.2
(58) Field of Search ............................. 280/739, 743.2, 280/743.1, 735, 731, 732

(56) References Cited

U.S. PATENT DOCUMENTS

| | | | |
|---|---|---|---|
| 5,016,913 A | * | 5/1991 | Nakajima et al. ............ 280/738 |
| 5,280,953 A | * | 1/1994 | Wolanin et al. ............. 280/739 |
| 5,308,113 A | | 5/1994 | Moriset ....................... 280/743 |
| 5,366,242 A | * | 11/1994 | Faigle et al. ................ 280/736 |
| 5,395,134 A | | 3/1995 | Gunn et al. .................. 280/743 |
| 5,489,119 A | | 2/1996 | Prescaro et al. .......... 280/743.2 |
| 5,603,526 A | * | 2/1997 | Buchanan .................... 280/739 |
| 5,743,558 A | * | 4/1998 | Seymour ...................... 280/739 |
| 5,746,447 A | | 5/1998 | Dyer et al. ............... 280/743.2 |
| 5,762,367 A | | 6/1998 | Wolanin ...................... 280/736 |
| 5,887,894 A | | 3/1999 | Castagner et al. ........ 280/743.2 |
| 5,945,184 A | | 8/1999 | Nagata et al. ............. 428/35.2 |
| 6,039,346 A | | 3/2000 | Ryan et al. .................. 280/736 |
| 6,076,854 A | | 6/2000 | Schenck et al. .......... 280/743.2 |
| 6,123,358 A | | 9/2000 | Ryan et al. .................. 280/739 |
| 6,139,048 A | * | 10/2000 | Braunschadel ........... 280/728.1 |
| 6,237,949 B1 | | 5/2001 | Nozumi et al. ............. 280/735 |
| 6,290,257 B1 | | 9/2001 | Bunce et al. ................ 280/739 |
| 6,390,501 B1 | | 5/2002 | Greib et al. ............. 280/743.2 |
| 6,422,597 B1 | | 7/2002 | Pinsenschaum et al. .... 280/735 |
| 6,425,603 B1 | | 7/2002 | Eschbach ................. 280/743.2 |
| 6,454,300 B1 | | 9/2002 | Dunkle et al. .............. 280/742 |
| 6,517,108 B1 | * | 2/2003 | Vinton et al. ............... 280/739 |

\* cited by examiner

Primary Examiner—David R. Dunn
(74) Attorney, Agent, or Firm—Scott A. McBain (57) ABSTRACT

An air bag assembly having an inflatable cushion selectively deployable to a controlled geometry with a controlled venting character. The venting characteristics are adjusted by selective displacement of vent blocking elements based upon measured occupant and/or crash severity characteristics such that an air bag cushion of desired volume and venting capacity is available to protect a range of occupants under different conditions during impact events of various levels of severity.

16 Claims, 11 Drawing Sheets

VARIABLE VENTING AIR BAG ASSEMBLY

CROSS-REFERENCE TO RELATED APPLICATIONS

This application claims priority from U.S. Provisional Application No. 60/305,004 filed Jul. 12, 2001 the contents of which are incorporated by reference as is fully set forth herein.

TECHNICAL FIELD

This invention relates to an air bag assembly, and more particularly to an air bag assembly including an inflatable air bag cushion and one or more selectively actuated vents within the air bag cushion. The vents are selectively actuated in conjunction with control of the inflated profile of the air bag cushion such that venting is matched in a predefined manner to the inflated profile characteristics of the air bag cushion.

BACKGROUND OF THE INVENTION

It is well known to provide an air bag assembly including an inflatable air bag cushion for protecting the occupant of a transportation vehicle. In an automotive vehicle, such air bag assemblies are typically located within the hub of the steering wheel and in a recess in the vehicle instrument panel for protection of the vehicle occupants seated in opposing relation to such assemblies. Additional air bag assemblies may be located within the seats and/or door panels for protection of the occupants during a side impact event.

Air bag assemblies typically include an inflatable cushion, and a gas emitting inflator mounted in fluid communication with the inflatable cushion. In a driver side air bag module, a base plate typically supports the inflator at the interior of the vehicle steering wheel or other appropriate location opposing the occupant to be protected. The mouth of the air bag is disposed in surrounding relation to the inflator with a perimeter portion of the mouth being held between the base plate and an overlying retainer to effect a secure relation between the inflator and the cushion. In a passenger side assembly, the inflator is typically held within a trough-like housing with the air bag cushion being held along the walls of the housing such that inflation gas passes from the inflator into the cushion upon activation of the inflator. Both driver side air bag modules and passenger side air bag modules are well known.

In the past it has been advocated to adjust the inflated profile of air bag cushions by the selective extension of tethering elements. By way of example only, representative systems for use in effecting a controlled deployment depth by selective release of tethering elements are disclosed in U.S. Pat. Nos. 5,887,894 to Castagner et al., and 6,390,501 to Greib et al. the teachings of which are incorporated by reference as is fully set forth herein.

SUMMARY OF THE INVENTION

The present invention provides advantages and alternatives over the prior art by providing an air bag assembly including one or more selectively activateable vents which may be opened on command during deployment of the air bag cushion such that venting is selectively controlled in a predefined manner. The control of such venting characteristics thus provides an additional degree of control over the deployment characteristics of the air bag cushion.

According to one aspect of the present invention, an air bag assembly is provided having an inflatable cushion selectively deployable to a controlled geometry with a controlled venting character. The venting characteristics are adjusted in view of crash severity and/or the position of the occupant and/or the size of the occupant and/or seat belt usage by the occupant to be protected such that an air bag cushion of desired volume and venting capacity is available to protect a range of occupants under different conditions during impact events of various levels of severity. The air bag assembly of the present invention provides a simple, cost effective and highly reproducible mechanism for controlling the venting character of the air bag cushion.

BRIEF DESCRIPTION OF THE DRAWINGS

The present invention will now be described by way of example only, with reference to the accompanying drawings which constitute a part of the specification herein and in which.

While the invention has been illustrated and generally described above, and will hereinafter be described in connection with certain exemplary embodiments, constructions, and procedures, it is to be understood that in no event is the invention to be limited to such illustrated and described embodiments, constructions, and procedures. On the contrary, it is intended that the present invention shall extend to all alternatives and modifications as may embrace the principles of this invention within the true spirit and scope thereof.

DESCRIPTION OF THE PREFERRED EMBODIMENT

Figure 1:
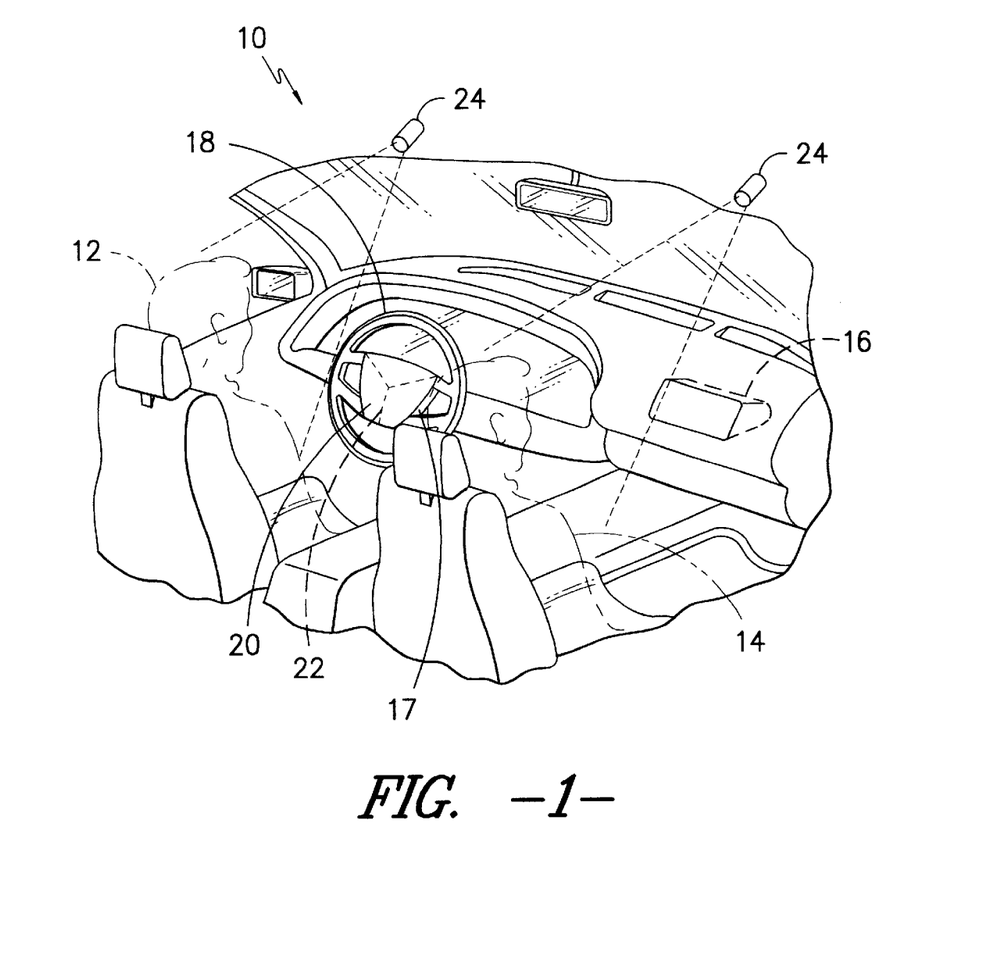
FIG. 1 is a view of the interior of an automotive vehicle incorporating driver side and passenger side air bag modules.

Reference will now be made to the drawings wherein to the extent possible like reference numerals are utilized to designate like components throughout the various views. In FIG. 1, there is illustrated the interior of a vehicle 10 for transporting an operator 12 and a passenger 14. As illustrated, the vehicle 10 may include a passenger side air bag assembly 16 mounted within the dash panel in substantially opposing relation to the vehicle passenger 14. The vehicle 10 will also preferably include a driver side air bag assembly 17 mounted within the steering wheel 18 for protection of the vehicle operator 12. According to a potentially preferred practice, the air bag assembly mounted within the steering wheel 18 is stored in hidden relation below a cover 20 which opens along tear seams 22 upon activation of the air bag assembly in a manner as will be well known to those of skill in the art. Such activation typically takes place upon the occurrence and measurement of predetermined vehicle conditions such as deceleration at a rate exceeding a predetermined value.

As shown, the vehicle 10 may incorporate one or more sensors 24 such as optical sensors for measuring the dimensions of the vehicle occupants 12, 14. Likewise, mass and/or position sensors (not shown) may be incorporated within the seating structure or at other suitable locations to provide further information upon the characteristics of the vehicle occupants. A sensor may also be provided to register whether or not the occupants are utilizing recommended seat belts. Data from the various sensors measuring occupant parameters as well as data from sensors measuring vehicle conditions may be translated to an on-board computer which in turn relays deployment activation signals to the driver side air bag assembly 17 and the passenger side air bag assembly 16 during a collision event.

Figure 2:
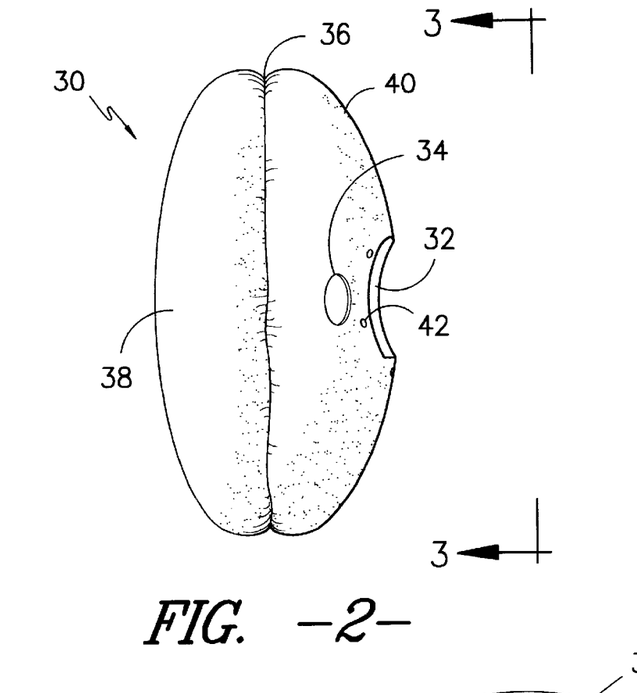
FIG. 2 is a side view of an exemplary air bag cushion.
Figure 3:
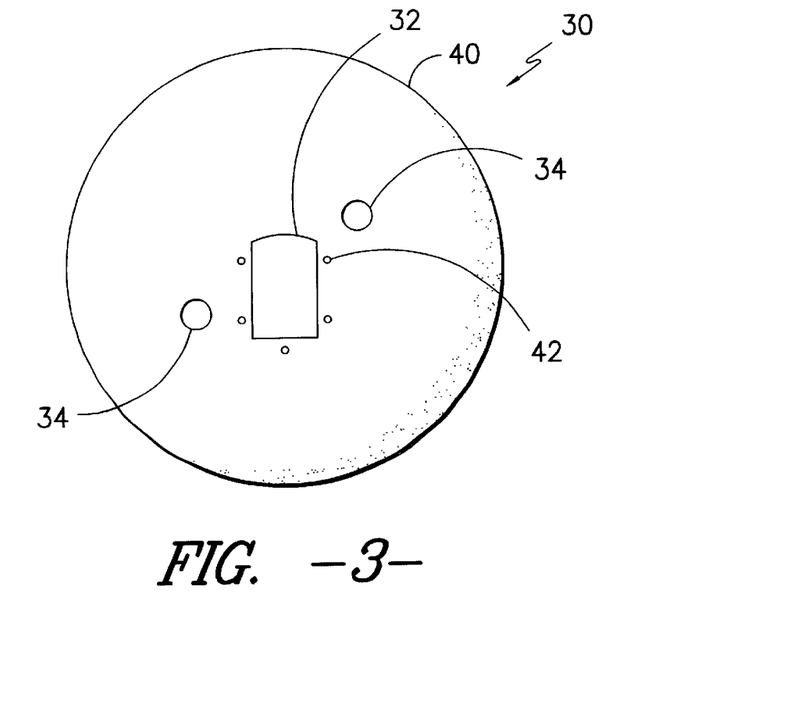
FIG. 3 is a view taken generally along line 3—3 in FIG. 2.

Referring to FIGS. 2 and 3, a typical inflatable air bag cushion 30 such as may be useful in a driver side assembly is illustrated. While the invention will hereinafter be illustrated and described in relation to a cushion 30 of a construction normally used in a driver side air bag assembly, the actual geometry of the cushion itself is in no way critical to the invention. Thus, it is to be understood that the invention will have equal applicability in a passenger side cushion as well as driver side cushions of other geometries.

As shown, the air bag cushion 30 may be formed by seaming together panels of substantially pliable material so as to form a gas containment chamber of suitable size and shape. By way of example only and not limitation, one configuration for an inflatable air bag cushion 30 is formed by seaming together two substantially disk shaped pieces of material to achieve a configuration substantially as illustrated in FIG. 3. As shown therein, the inflatable air bag cushion 30 incorporates a gas inlet opening 32 for introduction of inflation gas. The gas inlet opening 32 is preferably of a size and shape to permit clamping around a gas generating inflator as discussed further hereinafter.

The inflatable air bag cushion 30 includes one or more vent holes 34 for the expulsion of inflation gas following impact by the occupant to be protected. A seam 36 may be used to adjoin the panels of material forming the inflatable air bag cushion 30. Such an adjoining seam may be formed by traditional industrial sewing techniques as well as by adhesive bonding or welding techniques including RF (radio frequency) welding and ultrasonic welding as will be well known to those of skill in the art. In the illustrated construction the panel of material 38 projects towards the occupant to be protected so as to define an impact surface while the panel of material 40 faces generally away from the occupant to be protected. As best illustrated in FIG. 3, a number of vent holes 34 may be arranged across the panel 40 facing away from the occupant to promote the discharge of inflation gas as the occupant impacts the panel 38. An arrangement of mounting holes 42 may be disposed around the perimeter of the gas inlet opening 32 to permit the secure attachment of the gas inlet opening 32 around a gas generating inflator 44 (FIG. 4).

Figure 4:
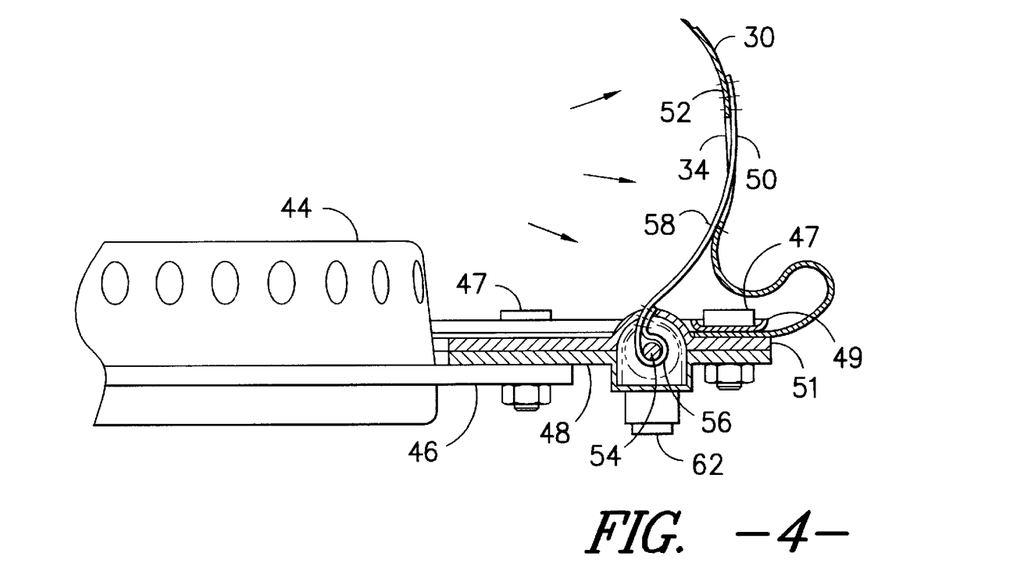
FIG. 4 is a hemispherical sectional view of a driver side air bag module incorporating a selectively activateable venting arrangement with a displaceable patch element in a vent covering orientation operatively connected to a release assembly at the interior of an air bag cushion.

In FIG. 4, one-half of an inflator 44 is illustrated with an air bag cushion 30 held in gas communicating surrounding relation to the inflator 44. As will be appreciated, the inflator 44 may include an outwardly projecting mounting flange 46 which may be secured to a base plate 48. Bolts 47 or other suitable fasteners extend through a clamping ring 49 (FIG. 8) having a configuration generally corresponding to the geometry of the gas inlet opening 32. The bolts 47 extend through aligned mounting holes 42 surrounding the cushion mouth such that the perimeter of the cushion mouth is clamped in place around the inflator 44. In the illustrated embodiment a cover plate 51 having a configuration adapted to accept a tether release mechanism 64 to be described further hereinafter is disposed between the clamping ring 49 and base plate 48. Of course, the illustrated arrangement is to be understood to be exemplary only and that the air bag cushion 30 may be arranged in fluid communication with the inflator 44 using any suitable attachment arrangement.

As illustrated, in the air bag arrangement illustrated in FIG. 4 at least one of the vent holes 34 is normally closed by an elongate patch element 50 which is secured at its distal end to a surface of the air bag cushion at an attachment location 52. The proximal end of the patch element 50 is normally secured in releasable anchored relation at a displaceable pin element 54. As shown, the proximal end of the patch element 50 may include a loop structure 56 disposed in sliding relation around the pin element 54.

As illustrated, according to one contemplated arrangement, the distal end of the patch element 50 is held at the exterior of the air bag cushion 30 at an attachment location 52 formed from a pattern of secure stitches arranged in a pattern such as a box-X seam or the like. The patch element 50 which is of elongate construction extends away from the attachment location 52 and is threaded through the vent hole 34 so as to enter the interior of the air bag cushion 30. If desired, a break-away tacking seam 58 may be used to join the patch element 50 to the interior surface of the air bag cushion 30 at a position between the vent hole 34 and the pin element 54 so as to maintain the position of the patch element in blocking relation across the vent hole 34 between the attachment location 52 and the break-away tacking seam 58. The proximal end may then extend away from the tacking seam 58 to the pin element 54 at a position inboard of the clamping ring 49 as shown.

Figure 5:
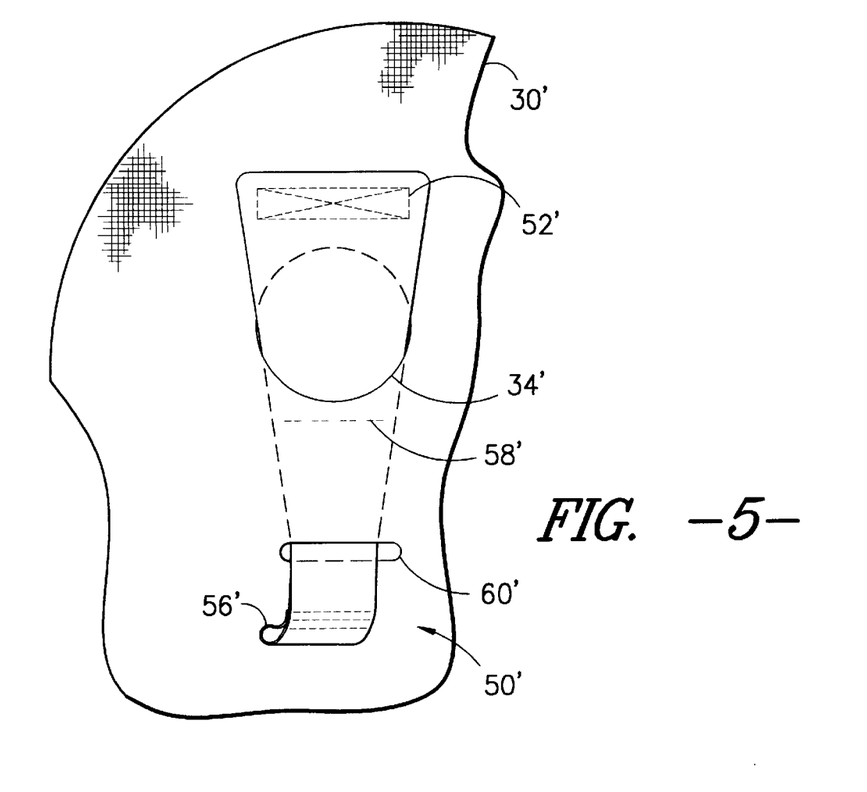
FIG. 5 illustrates a displaceable vent patch arrangement for operative connection to a release assembly at the exterior of an air bag cushion.

It is also contemplated that the releasable attachment between the pin element and the patch element may be outside of the air bag cushion 30. An arrangement for disposition of the patch element across a vent hole for releasable attachment outside the air bag cushion is illustrated in FIG. 5, wherein elements corresponding to those previously described are designated by like reference numerals with a prime. As shown, in this arrangement the distal end of the patch element 50' is held at the exterior of the air bag cushion 30' at an attachment location 52' formed from a pattern of secure stitches arranged in a pattern such as a box-X seam or the like. The patch element 50' which is of elongate construction extends away from the attachment location 52' and is threaded through the vent hole 34' so as to enter the interior of the air bag cushion 30'. If desired, a break-away tacking seam 58' may be used to join the patch element 50' to the interior surface of the air bag cushion 30' at a position between the vent hole 34' and the pin element 54' so as to maintain the position of the patch element in blocking relation across the vent hole 34' between the attachment location 52' and the break-away tacking seam 58'. The patch element 50' then extends back through an exit slot 60' at a position below the break-away tacking seam for engagement with a displaceable pin element (not shown).

Figure 6:
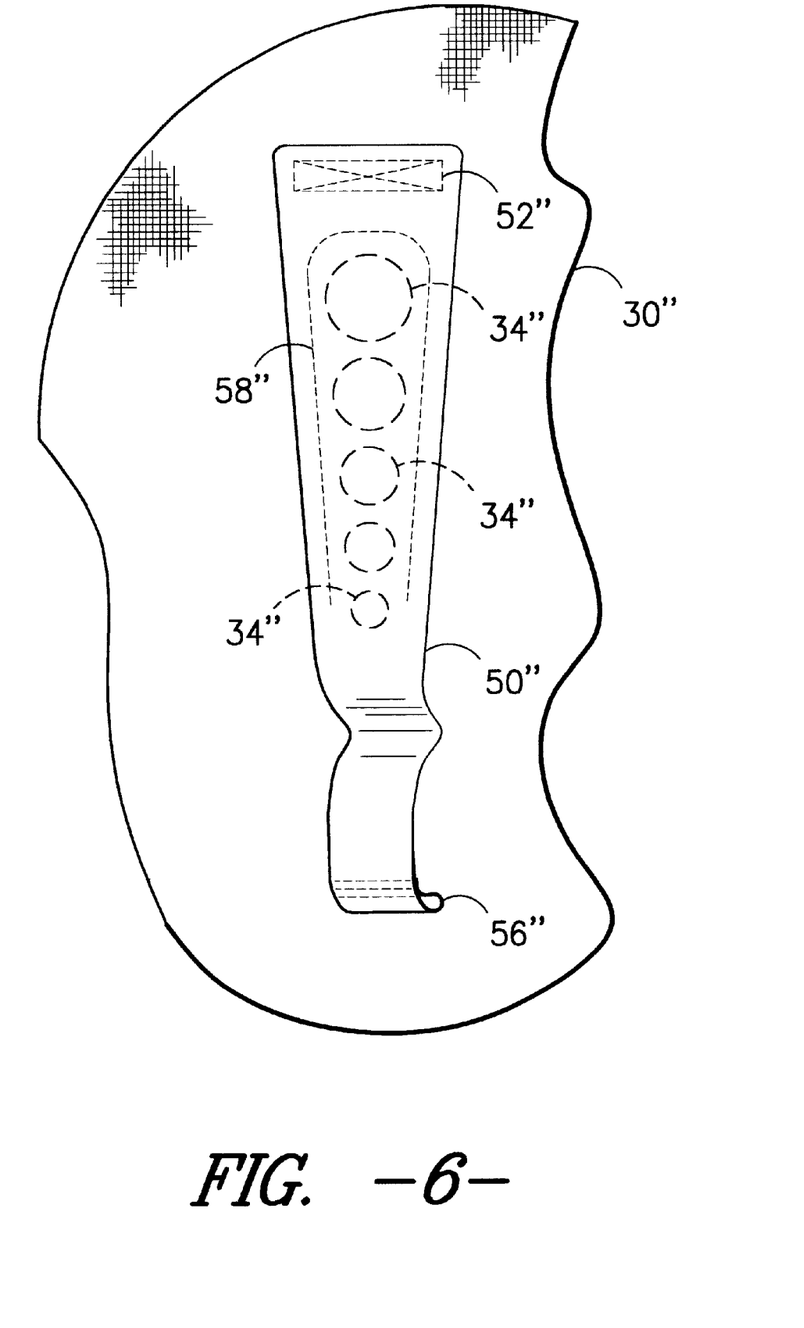
FIG. 6 is a view illustrating an alternative arrangement for a displaceable patch element.

Yet another arrangement for placement of the patch element is illustrated in FIG. 6 wherein reference numerals correspond generally to those in FIG. 5 but with a double prime. As shown in FIG. 6, the elongate patch element 50" is secured to the exterior surface of the air bag cushion 30" at a secure attachment location 52". The patch element 50" is normally held over an arrangement of vent holes 34" by a break-away seam 58" extending at least partially along the length of the patch element 50" adjacent to and outboard of the vent holes 34". In such an arrangement, when the patch element 50 is held at the anchoring pin (not shown), a covering relation is maintained across the vent holes 34. Of course, this may be on either the interior or exterior of the air bag cushion 30". However, when the elongate patch element 50" is released, the pressure acting from the interior of the air bag cushion 30" causes the break-away seam 58" to begin failing thereby progressively opening the vent holes 34".

As shown, the patch element 50" may be tapered from a broader width at the secure attachment location 52" to a more narrow width extending towards the loop structure 56". Such a structure is believed to concentrate the initial tearing force at the more narrow regions of the patch element 50". This concentration of tearing force is believed to facilitate the progressive failure of the break-away seam 58" such that failure is initiated at the vent hole 34" farthest away from the secure attachment location 52" and thereafter progresses towards the secure attachment location 52" as pressure is increased. It is believed that such a progressive development of venting may be desirable in some instances.

According to the contemplated practice of the invention, the pin element 54 is displaceable relative to the patch element 50 on command based upon input data from the various sensors measuring the conditions of the occupant to be protected and/or crash severity. By way of example only, and not limitation, in the event that the inflator 44 is a dual stage inflator, it is contemplated that the patch element 50 may be released in conjunction with the activation of the second inflator stage (i.e. when additional gas is discharged into the air bag cushion 30). It is contemplated that this may occur when the crash is severe and/or when the occupant to be protected is large and/or when the occupant is seated an extended distance away from the air bag cushion 30 and/or when the occupant is not using the recommended seat belt. Of course, it is to be understood that the actual activating conditions will likely vary from vehicle to vehicle based upon factors such as vehicle type and air bag cushion placement location.

Figure 7:
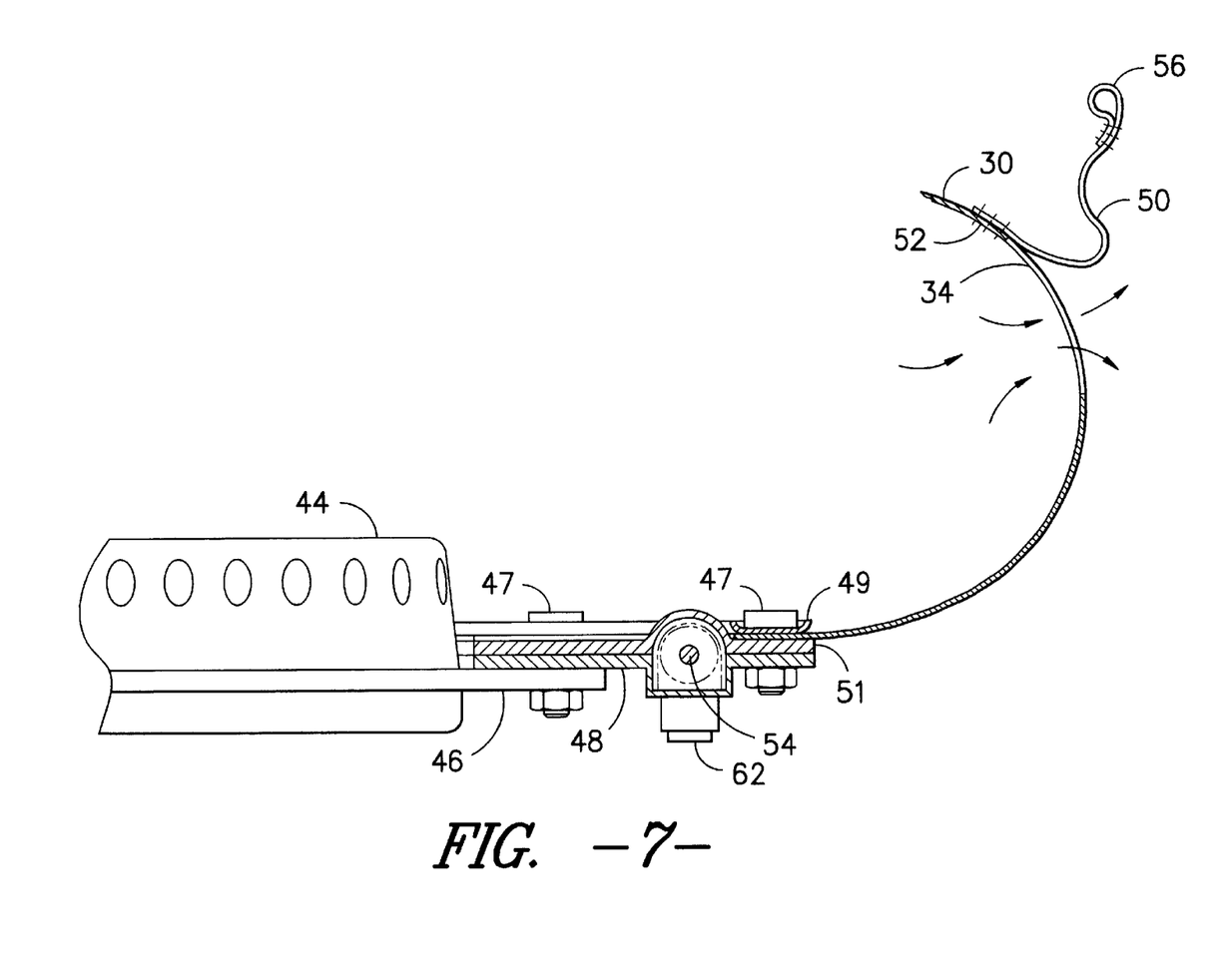
FIG. 7 is a view similar to FIG. 4 illustrating the vent in an open flow through condition.

Upon the achievement of disengagement, the patch element 50 is free to move out of covering relation relative to the vent hole 34 as pressure is applied by the inflating gas. In the arrangement illustrated in FIGS. 4 and 7, the patch element 50 slides out through the vent hole 34. If the patch element is arranged as illustrated in FIG. 6, it will progressively tear away from the vent holes 34" as pressure increases. As will be appreciated, a higher activating pressure may be required to effect the movement of the patch element with higher strength break-away tacking seams. Thus, it is contemplated that strength of any break-away tacking seams may provide an additional degree of control over the venting characteristics of the cushion. That is, stronger break-away seams may be utilized if higher activating pressures are desired.

Figure 8:
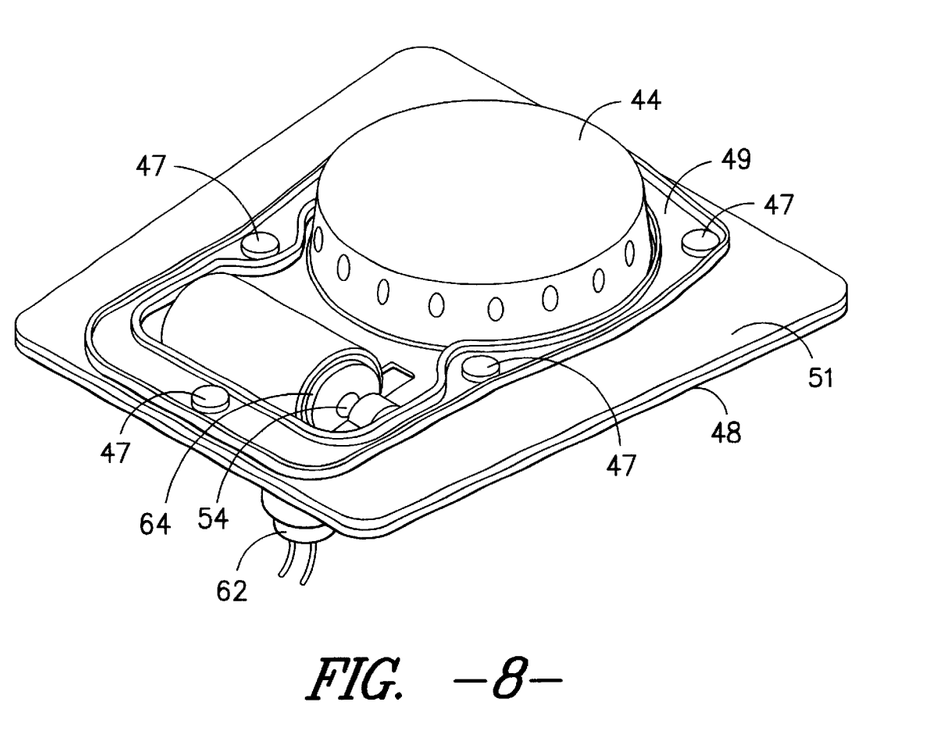
FIG. 8 illustrates an exemplary inflator and pin release assembly for releasing a displaceable patch element with the air bag cushion not shown.
Figure 9A:
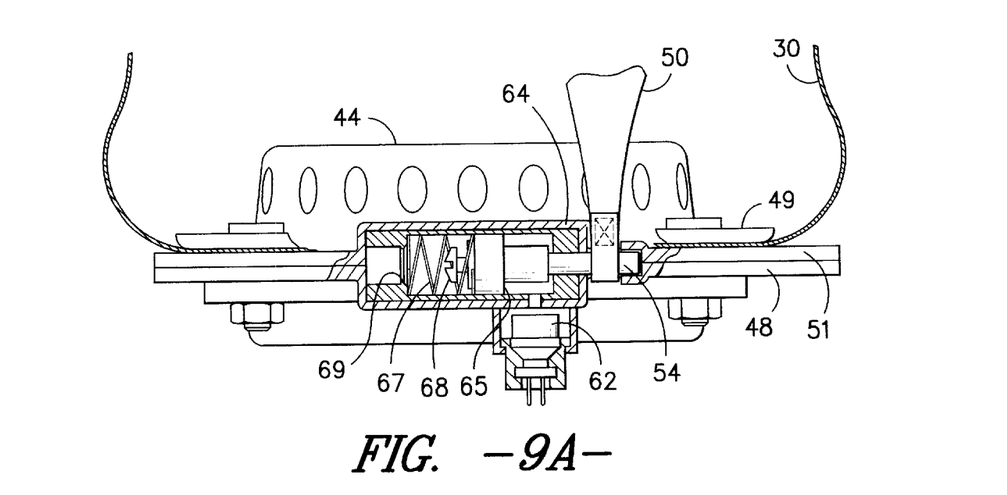
FIG. 9A is a cut-away view of the pin release assembly of FIG. 8 holding the displaceable patch element in an anchored condition.
Figure 9B:
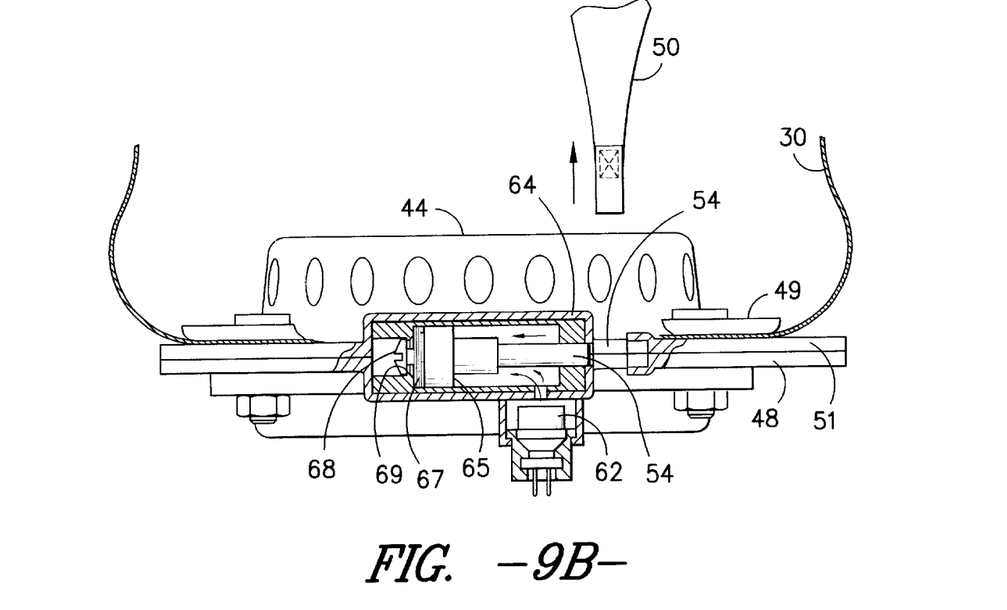
FIG. 9B is a view similar to FIG. 9A with the pin release assembly disengaged from the displaceable patch element.

It is contemplated that the patch element 50 may be disengaged from the pin element 54 by any number of mechanisms resulting in the relative movement of the patch element and the pin element. By way of example only, and not limitation, one potential arrangement for use in moving the pin element 54 out of engagement with the patch element 50 is illustrated in FIGS. 8, 9A and 9B. In the Illustrated arrangement, the pin element 54 normally projects out of a chamber 64 which is in fluid communication with a pressure generating squib 62. In operation the squib 62 which is selectively activateable when occupant and/or vehicle conditions indicate that enhanced venting is desired. Thus, in instances such as an impact involving an extremely large occupant, the squib 62 is activated by a signal from an on-board computer causing surge in pressure within the chamber 64.

As best seen through simultaneous reference to FIGS. 9A and 9B, the surge in pressure within the chamber 64 acts against a plunger 65 which is operatively connected to the pin element 54. Upon the establishment of sufficient pressure within the chamber 64, the plunger 65 is moved through the chamber 64 so as to compress a biasing spring 67 which normally serves to maintain the pin element in the outwardly projecting orientation shown in FIG. 9A. The pin element 54 is thus drawn into the chamber and out of engagement with the patch element 50. The patch element is thereafter no longer anchored at the pin element and is thus free to move out of covering relation relative to vent openings within the air bag cushion. According to the illustrated construction, a male snap fit locking element 68 may project away from the plunger in the direction of plunger movement for locking engagement with a cooperating acceptance opening 69 so as to prevent the plunger 65 and pin element from springing back following compression. Of course, the relative orientation of the male and female locking elements may also be reversed if desired. Likewise, it is to be understood that virtually any alternative arrangement for moving the pin element 54 and/or the patch element 50 may be utilized to effect the desired disengagement.

Figure 10:
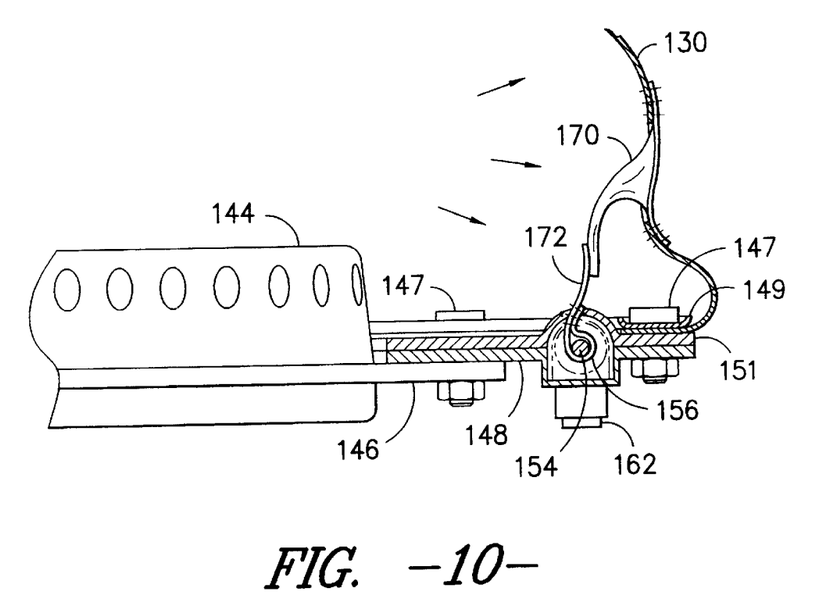
FIG. 10 is a view similar to FIG. 4 illustrating a selectively deployable tube vent construction.

It is also contemplated that structures other than two dimensional patches may be utilized to selectively block venting within the cushion. By way of example only and not limitation one alternative arrangement is illustrated in FIG. 10 wherein elements corresponding to those previously described are designated by like reference numerals increased by 100. In the assembly illustrated in FIG. 10, the air bag cushion 130 includes a vent opening in the form of a hollow venting tube 170 which is normally held at the interior of the cushion 130 by a releaseable tethering strap 172 secured at a releasable anchor pin 154 displaceable as previously described.

Figure 11A:
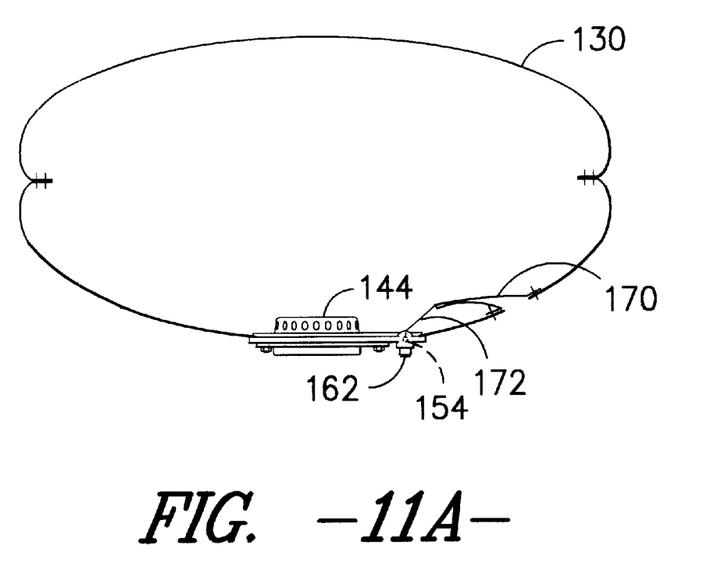
FIG. 11A is a schematic view of an air bag assembly incorporating a tube vent as shown in FIG. 10 with the tube vent held in a gas blocking position.
Figure 11B:
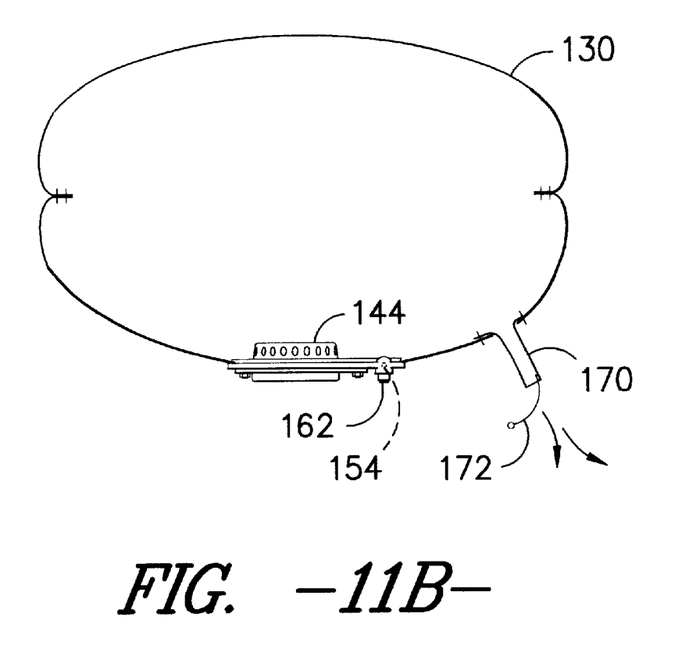
FIG. 11B is a view similar to FIG. 9A with the tube vent released to a flow-through orientation for emission of inflation gas.

As illustrated in FIG. 11A, when the air bag cushion 130 is inflated, the walls of the air bag cushion 130 move outwardly thereby placing the venting tube 170 into tension as it strains against the tethering strap 172. This tension causes the venting tube 170 to naturally pinch off thereby restricting the outward flow of inflation gas. However, as illustrated in FIG. 11B, when the tension between the venting tube 170 and the tethering strap 172 is released, the venting tube 170 is allowed to open up and can be pushed outwardly from the interior of the air bag cushion 130 thereby permitting the venting of inflation gas as pressure is built within the cushion.

Figure 12A:
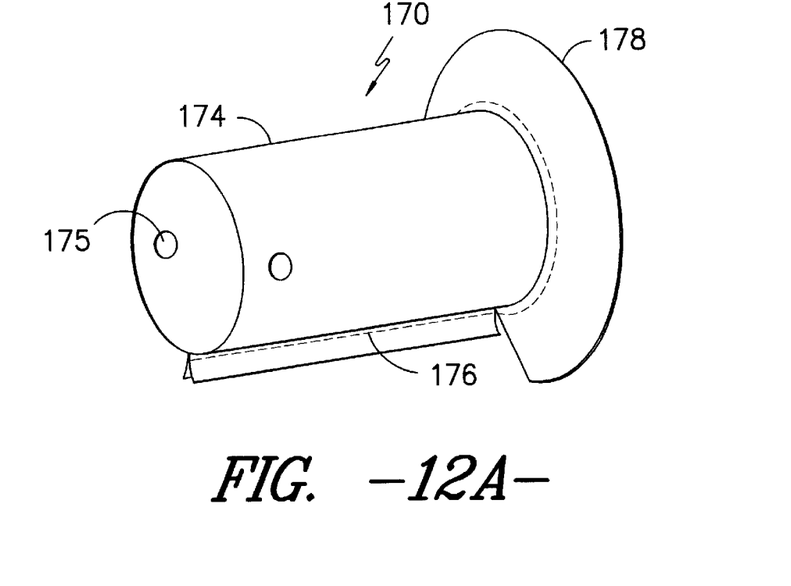
FIGS. 12A–12C illustrate various tube vent constructions.

In an assembly which utilizes a tubular vent arrangement, it is contemplated that the venting tube may have a wide array of constructions. By way of example only, and not limitation, one contemplated construction for a venting tube 170 is illustrated in FIG. 12A. In this construction the venting tube 170 includes an elongate nozzle portion 174 which may be formed by running an adjoining elongate seam along opposing edges of a flat piece of pliable material such as fabric, film or the like. One end of the nozzle portion 174 may be adjoined to a base portion 178 such as a panel of fabric or film of generally annular geometry. The base portion 178 may in turn be seamed to the exterior of the air bag cushion 130 around a standard vent opening. If desired, the nozzle portion 174 may include one or more surface apertures 175 for attachment of the tethering strap. Preferably, the nozzle portion 174 is of sufficient pliability to permit it to be pushed in collapsing relation into the interior of the cushion 130 during packaging.

Figure 12B:
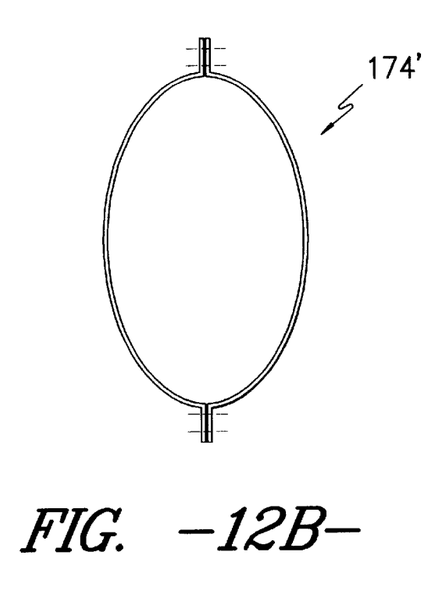
Figure 12C:
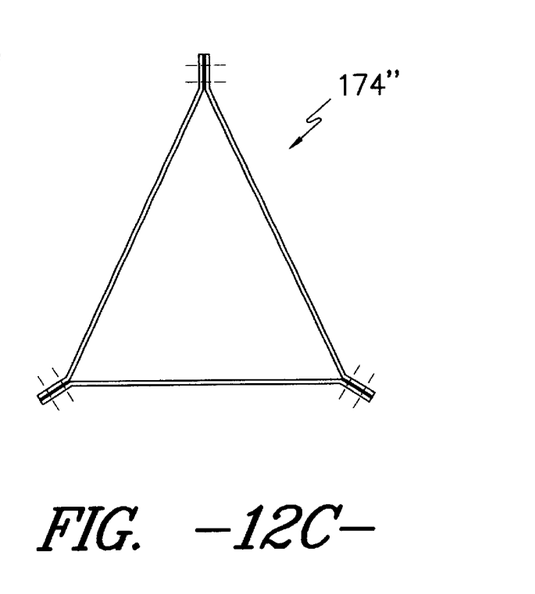

Of course it is to be appreciated that the actual construction of the vent tube may be the subject of a wide range of alternatives. By way of example only, in FIG. 12B a cross section of a nozzle portion 174' is shown formed from the joinder of two strips of material. In FIG. 12C, a cross section of a nozzle portion 174" is shown formed from the joinder of three strips of material.

Figure 13:
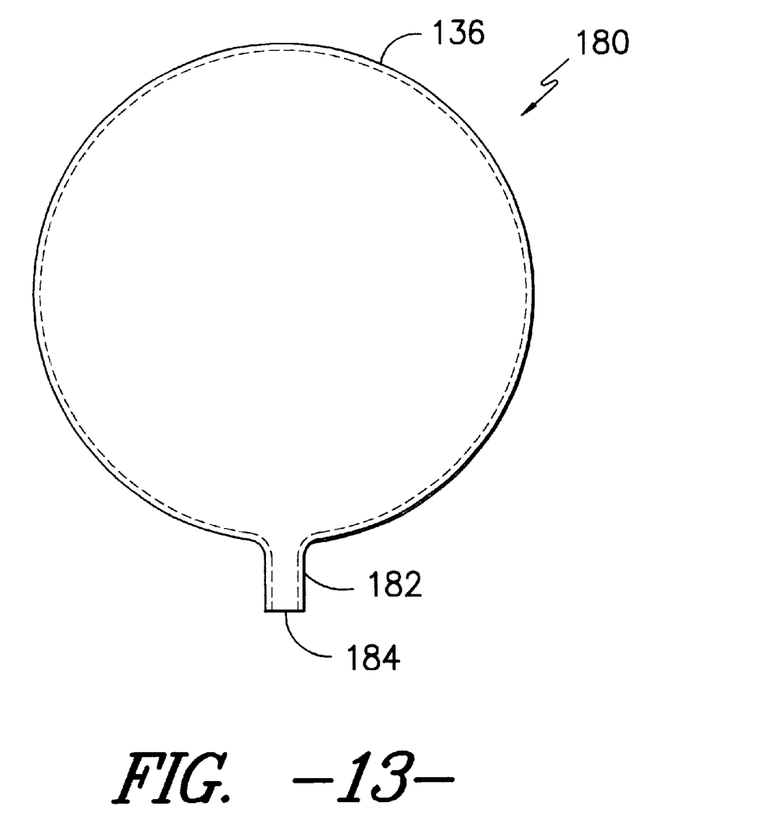
FIG. 13 is an elevation plan view of an air bag cushion arrangement incorporating an integral tube vent structure.

It is also contemplated that the vent tube may be integral to the cushion rather than being formed separately and thereafter attached. One panel construction which provides such an integral tube vent is illustrated in FIG. 13. As will be appreciated, two mating panels 180 which each include a protrusion 182 may be adjoined around their perimeter by a seam 136 substantially as described in relation to the cushion illustrated in FIG. 2. However, the seam 136 is left open at the outwardly projecting ends of the protrusions 182. The opposing protrusions which are adjoined along their edges thus define a venting nozzle with a gas emission opening 184 at the open end. Due to the substantially pliable nature of the fabric or other material forming the panels 180, the nozzle formed may be pushed to the interior of the formed cushion for attachment to a releasable tether to effect controlled venting in the manner previously described.

It is to be understood that while the present invention has been illustrated and described in relation to various exemplary embodiment, constructions, and practices, that such embodiments, constructions, and practices are intended to be illustrative only and that the present invention is in no event to be limited thereto. Rather, it is contemplated that modifications and variations embodying the principles of the present invention will no doubt occur to those of skill in the art and it is therefore contemplated and intended that the present invention shall extend to all such modifications and variations as may incorporated the broad principles of the invention within the full spirit and scope thereof.

What is claimed is:

1. An air bag safety system for cushioning restraint of a vehicle occupant during an impact event, the safety system comprising:

an inflatable air bag cushion having at least one vent opening;

an inflator activatable to discharge inflation gas upon the occurrence of predetermined vehicle conditions;

a displaceable vent blocking element supported at a surface of the air bag cushion and normally disposed in blocking relation to said at least one vent opening so as to at least partially obstruct the passage of inflation gas through to said at least one vent opening, wherein the vent blocking element is operatively connected to a releasable anchor structure such that the vent blocking element is normally held in tension when the air bag cushion is inflated; and an actuation mechanism selectively activatable based upon measurements from one or more sensors measuring conditions of the occupant to release the vent blocking element from the releasable anchor structure when increased venting capacity is desired, and wherein the vent blocking element is adapted to at least partially open said at least one vent opening when the vent blocking element is released from the releasable anchor structure.

2. The safety system according to claim 1, wherein the vent blocking element comprises an elongate patch of pliable material.

3. The safety system according to claim 2, wherein the elongate patch is secured at a first end to an exterior surface of the air bag cushion and is threaded in sliding relation through said at least one vent opening to an interior region of the air bag cushion so as to at least partially block said at least one vent opening when the elongate patch is held in tension.

4. The safety system according to claim 3, wherein a tear-away seam is disposed between the elongate patch and an interior surface of the air bag cushion at a location between said at least one vent opening and said releasable anchor structure such that the elongate patch is normally held in position in threaded relation across said at least one vent opening and wherein the tear-away seam is adapted to fail when the elongate patch is disengaged from the releasable anchor and pressure within the air bag cushion exceeds a predefined level.

5. The safety system according to claim 3, wherein the elongate patch is formed of fabric.

6. The safety system according to claim 1, wherein the vent blocking element comprises an elongate patch of pliable material and wherein the elongate patch is secured at a first end to a surface of the air bag cushion and extends in covering relation over a plurality of vent openings within the air bag cushion so as to block at least a portion of said vent openings when the elongate patch is held in tension between said first end and the releasable anchor structure.

7. The safety system according to claim 6, wherein a pattern of tear away seams extends at least partially along the length of the elongate patch in connecting relation between the elongate patch and a surface of the air bag cushion in outboard relation to said vent openings and wherein the tear-away seams are adapted to fail when the elongate patch is disengaged from the releasable anchor and pressure within the air bag cushion exceeds a predefined level.

8. The safety system according to claim 7, wherein the tear-away seams are adapted to progressively fail in a predefined path extending from a position remote from the first end of the elongate patch towards the first end of the elongate patch as pressure within the air bag cushion is increased.

9. The safety system according to claim 6, wherein the elongate patch is formed of fabric.

10. An air bag safety system for cushioning restraint of a vehicle occupant during an impact event, the safety system comprising:

an inflatable air bag cushion having at least one vent opening;

an inflator activatable to discharge inflation gas upon the occurrence of predetermined vehicle conditions;

a displaceable vent blocking element comprising an elongate nozzle of collapsible construction supported at a surface of the air bag cushion in surrounding relation to said at least one vent opening;

an elongate tethering element operatively connected between the nozzle and a releasable anchor structure such that the nozzle is normally held in tension when the air bag cushion is inflated so as to at least partially obstruct the passage of inflation gas through the nozzle to said at least one vent opening; and an actuation mechanism selectively activatable based upon measurements from one or more sensors measuring conditions of the occupant to release the tethering element so as to relieve tension across the nozzle and open the nozzle for passage of gas out of the air bag cushion.

11. The safety system according to claim 10, wherein the nozzle is integral to the air bag cushion.

12. The safety system according to claim 10, wherein the nozzle is attached across a surface of the air bag cushion facing substantially away from the occupant to be protected.

13. The safety system according to claim 10, wherein the nozzle comprises a tubular construction formed from one piece of material enclosed by an elongate seam.

14. The safety system according to claim 10, wherein the nozzle comprises a hollow construction formed from a plurality of pieces of material enclosed by a plurality of seams.

15. The safety system according to claim 1, wherein the air bag cushion is a driver side air bag cushion comprising two panels seamed around their perimeters.

16. The safety system according to claim 10, wherein the air bag cushion is a driver side air bag cushion comprising two panels seamed around their perimeters.

* * * * *